O. KJELDAAS.
STUD AND SOCKET FASTENING FOR GARMENTS.
APPLICATION FILED JULY 29, 1916.

1,223,181.

Patented Apr. 17, 1917.

Inventor
Oscar Kjeldaas.
By J. B. Singer
Atty.

UNITED STATES PATENT OFFICE.

OSCAR KJELDAAS, OF CHRISTIANIA, NORWAY.

STUD-AND-SOCKET FASTENING FOR GARMENTS.

1,223,181.

Specification of Letters Patent.   Patented Apr. 17, 1917.

Original application filed June 15, 1914, Serial No. 845,257. Divided and this application filed July 29, 1916. Serial No. 112,095.

*To all whom it may concern:*

Be it known that I, OSCAR KJELDAAS, a subject of the King of Norway, residing at the city of Christiania, in Norway, have invented certain new and useful Improvements in Stud - and - Socket Fastenings for Garments, of which the following is a specification, reference being had therein to the accompanying drawing.

The present invention relates to stud and socket fastenings for garments, or so-called press-buttons, of the kind described in my co-pending application Serial No. 845,257 of which this application is a division, and in which the socket member is made of a piece of wire formed into an eye for engaging the stud and into loops and eyes for fixing to the garment.

Figure 1:
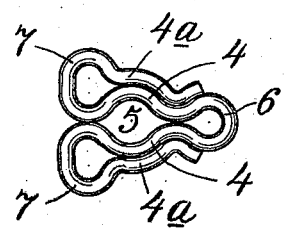
Figure 2:
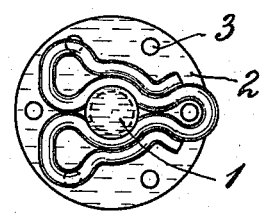
Figure 3:
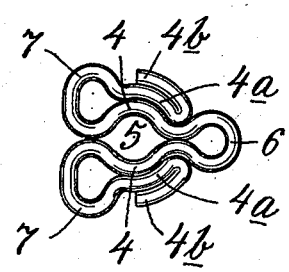
Figure 4:
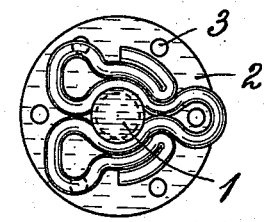

The new press-button is illustrated on the appended drawing, in which Figure 1 represents the socket member and Fig. 2 shows the socket and stud connected together; Figs. 3 and 4 represent a modification of Figs. 1 and 2 respectively.

Said figures are identical with certain figures in my prior application numbered 845,257 for press-buttons, filed June 15, 1914.

In the several figures 1 is the head and 2 the base of the stud, and 3 are holes for the fastening threads. The socket member in Figs. 1 and 2 is formed of a single wire with a loop or eye 6 of suitable size to afford necessary spring action. The branches of the wire are bent into bows 4 so as to form a circular eye 5 (the button-hole proper) for the stud. The ends of said branches are formed into loops or eyes 7, 7 of a somewhat elongated shape.

The sides of the eye for the stud are provided with additions $4^a$, $4^a$, said additions being produced by extension of the wire from the loops 7, 7. The object of said additions being to widen the sides of the eye 5 so as to make it easier to find the hole during the buttoning operation.

In Figs. 3 and 4 are shown further additions $4^b$, $4^b$ making the sides of the button-hole still wider for the same purpose.

Having thus fully described my invention, what I claim as new and desire to secure by Letters Patent, is:

In a press-button, a socket member consisting of a single wire bent to form a loop or eye, the branches being curved to form a circular eye for engaging a stud, and the branches being continued and re-curved upon the outside of said circular eye and loop to approximately its entire length forming additions to the eye in close juxtaposition to the outside of the same broadening its surface for facilitating the buttoning operation.

In testimony whereof I affix my signature in presence of two witnesses.

OSCAR KJELDAAS.

Witnesses:
C. VARMAR,
N. G. TANDBERG.

Copies of this patent may be obtained for five cents each, by addressing the "Commissioner of Patents, Washington, D. C."